United States Patent
Lynch

(10) Patent No.: US 9,575,497 B2
(45) Date of Patent: Feb. 21, 2017

(54) CURRENT CONTROL CIRCUIT FOR LINEAR LED DRIVER

(71) Applicant: MICROCHIP TECHNOLOGY INC., Chandler, AZ (US)

(72) Inventor: Scott Lynch, Half Moon Bay, CA (US)

(73) Assignee: Microchip Technology Inc., Chandler, AZ (US)

(*) Notice: Subject to any disclaimer, the term of this patent is extended or adjusted under 35 U.S.C. 154(b) by 91 days.

(21) Appl. No.: 14/244,746

(22) Filed: Apr. 3, 2014

(65) Prior Publication Data

US 2015/0286230 A1 Oct. 8, 2015

(51) Int. Cl.
*G05F 1/56* (2006.01)
*H05B 33/08* (2006.01)

(52) U.S. Cl.
CPC ............ *G05F 1/56* (2013.01); *H05B 33/0824* (2013.01)

(58) Field of Classification Search
CPC ............ G05F 1/10; G05F 1/461; G05F 1/462; G05F 1/468; G05F 1/56; G05F 1/561; G05F 1/565
See application file for complete search history.

(56) References Cited

U.S. PATENT DOCUMENTS

| | | | |
|---|---|---|---|
| 6,373,734 B1* | 4/2002 | Martinelli | H02M 1/4225 323/222 |
| 7,906,941 B2* | 3/2011 | Jayaraman | H02M 1/4225 323/222 |
| 8,541,951 B1 | 9/2013 | Shum et al. | |
| 8,630,105 B2* | 1/2014 | Uno | H02M 1/36 323/299 |
| 2013/0069546 A1* | 3/2013 | Lin | H05B 33/0812 315/186 |

FOREIGN PATENT DOCUMENTS

| EP | 2 563 094 2 | 2/2013 |
| TW | 201340776 A | 10/2013 |

OTHER PUBLICATIONS

Leon-Masich, A.; Valderrama-Blavi, H.; Bosque-Moncusi, J.M.; Martinez-Salamero, L., "A high voltage SiC-based boost PFC for LED applications," in Ecological Vehicles and Renewable Energies (EVER), 2014 Ninth International Conference on , vol., No., pp. 1-5, Mar. 25-27, 2014.*
Ellis, George. Observers in Control Systems. 2002. Academic Press. Chapter 2 (pp. 5-39).*

* cited by examiner

*Primary Examiner* — Harry Behm
*Assistant Examiner* — Peter Novak
(74) *Attorney, Agent, or Firm* — DLA Piper LLP (US)

(57) ABSTRACT

Employed within an LED driver operating from the AC power line, the invention controls both input current and output power. With this regulation circuit, input current appears purely resistive, precisely tracking the input voltage waveshape. At the same time, it provides good line regulation and inherent phase dimmer compatibility, requiring no special circuitry to detect and handle a dimmer.

3 Claims, 15 Drawing Sheets

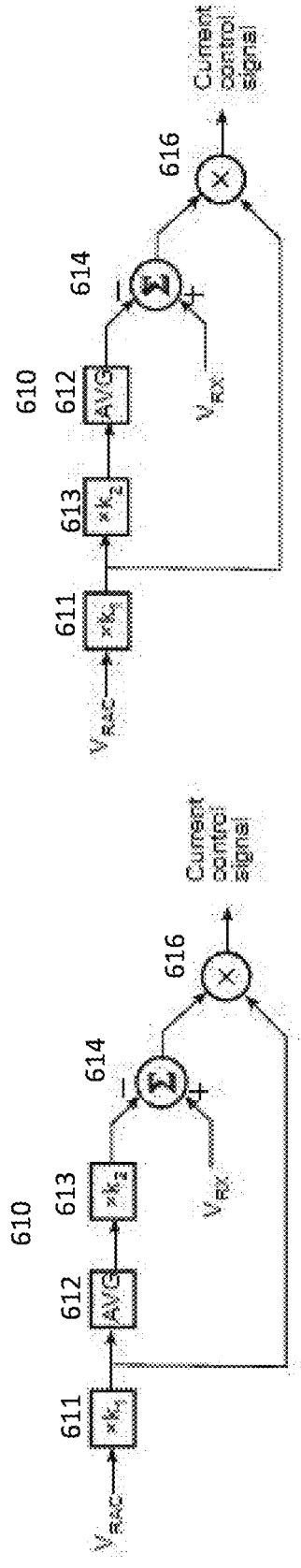
FIGURE 13A
FIGURE 13B
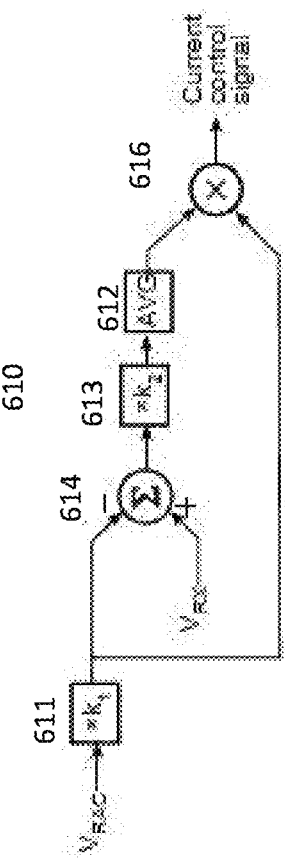
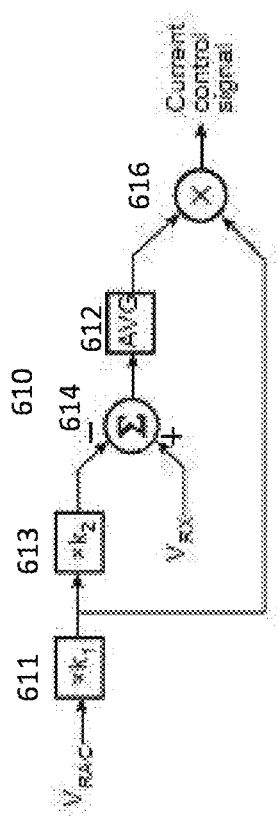
FIGURE 13C
FIGURE 13D

CURRENT CONTROL CIRCUIT FOR LINEAR LED DRIVER

TECHNICAL FIELD

This invention relates to current control circuits as applied to regulators operated from a high voltage AC source and driving a matrix of LEDs.

BACKGROUND OF THE INVENTION

Ideally, when a lamp is powered from a sine wave source, such as the electrical grid, it is desirable for the lamp to appear to the source as purely resistive. That is, it should draw current from the source in phase with, and closely matching, the voltage waveform. This minimizes stress on the electricity generating and transmission infrastructure. However, as input voltage amplitude varies, the light output from the lamp should remain fairly constant. This requires line regulation circuitry.

While line regulation seeks to maintain constant light output as the voltage applied to the lamp decreases, dimmers are intended to reduce lamp brightness by effectively reducing voltage supplied to the lamp. When an external dimmer reduces supply voltage, line regulation circuitry in the lamp responds by increasing input current in order to maintain relatively constant power and lamp brightness, thus rendering the dimmer ineffective.

Of greater concern is that at low dimming levels, line regulation circuitry can increase input current to destructive levels, which is a safety issue.

Complex circuitry is often required to detect the presence of a dimmer and even more circuitry to respond appropriately.

Driving LEDs from the AC line requires unique qualities. While the AC line is a constant-voltage sine wave, LEDs require constant DC current to operate. There exists many ways to drive a matrix of LEDs from an AC source. Conventionally, an inductive approach is taken, using an inductive element to store and release energy at different input and output voltages. This is the traditional switching power supply approach. This has the disadvantages of utilizing bulky, expensive magnetics, generating EMI due to the high switching frequencies involved, a difficulty in achieving good power factor, the use of limited-lifetime electrolytic capacitors, requiring high current devices, and difficulties with dimmer compatibility.

To address these problems and to simplify circuitry, multi-stage, sequentially-operated linear regulators have been used to drive a segmented string of LEDs. Instantaneous input current roughly follows input voltage, providing low distortion and good power factor. And they are inherently compatible with most dimmers.

As depicted in FIG. 1, in a prior art, multi-stage, sequentially-operated linear regulator, a long string of LEDs is tapped at multiple locations, each tap having a linear current regulator that controls the LED current of upstream string segments. As instantaneous rectified input voltage rises, downstream segments get enough voltage to begin conducting. Once a segment starts conducting, the downstream regulator takes over from the upstream regulator. This limits the voltage across the regulators when they are conducting, minimizing power loss.

Typically, each regulator operates at a fixed current level. Thus the input current waveshape is a stairstep rather than a smooth sine wave, causing input current harmonics.

Line regulation has also been a problem in the prior art. That is, output power, and thus brightness, varies as time-averaged input voltage varies.

What is needed is an improved current control circuit for an LED driver that overcomes these problems and shortcomings in the prior art.

SUMMARY OF THE INVENTION

The invention described herein, when applied to a matrix of LEDs and the linear current regulators driving the matrix, provides a continuous input current and compensates for variations in input voltage. The invention also provides inherent dimmer compatibility while maintaining good line regulation over the normal supply voltage range. It requires no special detection and response to a dimmer.

BRIEF DESCRIPTION OF THE DRAWINGS

FIGS. 13A-13L depict different configurations of components for a line regulation circuit.

DETAILED DESCRIPTION OF THE PREFERRED EMBODIMENTS

Figure 1:
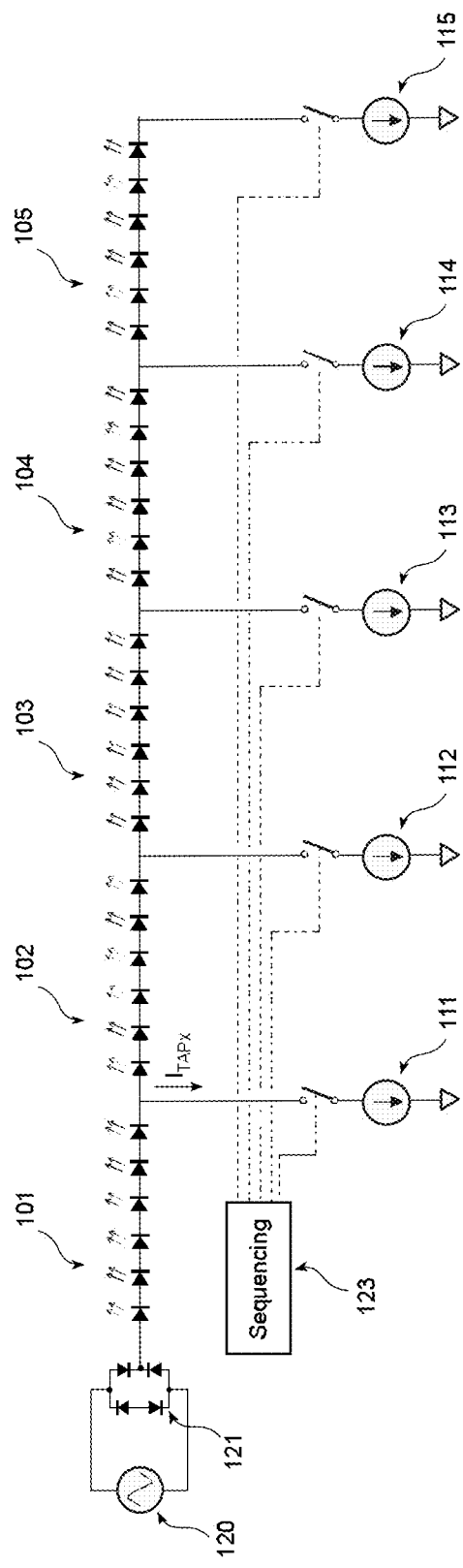
FIG. 1 depicts a prior art linear regulator system used with strings of LEDs.

Referring to FIG. 1, a prior art LED driver based on multi-stage, sequentially-operated linear current regulators is shown. The input supply is a regulated-voltage AC sine wave source 120 connected to a full-wave bridge rectifier 121. The rectified AC is used to supply LED segments 101, 102, 103, 104, and 105. The AC input voltage may assume waveshapes other than a pure sine wave, including so-called pseudo-sine found in DC-AC inverters.

Initially, the input voltage begins at zero volts and all the regulators 111, 112, 113, 114, and 115 are on but not conducting as there is insufficient voltage to forward bias the first LED segment 101. As the instantaneous rectified AC voltage increases, there becomes enough voltage to forward bias the LED segments, starting with the first segment 101 and progressing downstream. As a downstream segment becomes forward biased, for example string 103, the linear current regulator associated with that segment, for example regulator 113 associated with string 103, begins to conduct. Eventually, this downstream regulator achieves regulation.

The sequencing logic 123 then shuts off the upstream regulators, for example regulators 111 and 112 when regulator 113 is conducting. Shutting off an upstream regulator minimizes the voltage drop across the linear regulators when they are conducting, minimizing power losses and increasing efficiency.

The sequence of events reverse on the downslope of the rectified AC. Specifically, as the rectified AC voltage decreases, the downstream segments will stop being forward biased and will stop conducting. Sequencing logic 123 will shut off the downstream regulators and turn on the upstream regulators. For example, when string (105) becomes reverse biased, sequencing logic 123 will turn off regulator 115 and turn on regulator 114.

Figure 2:
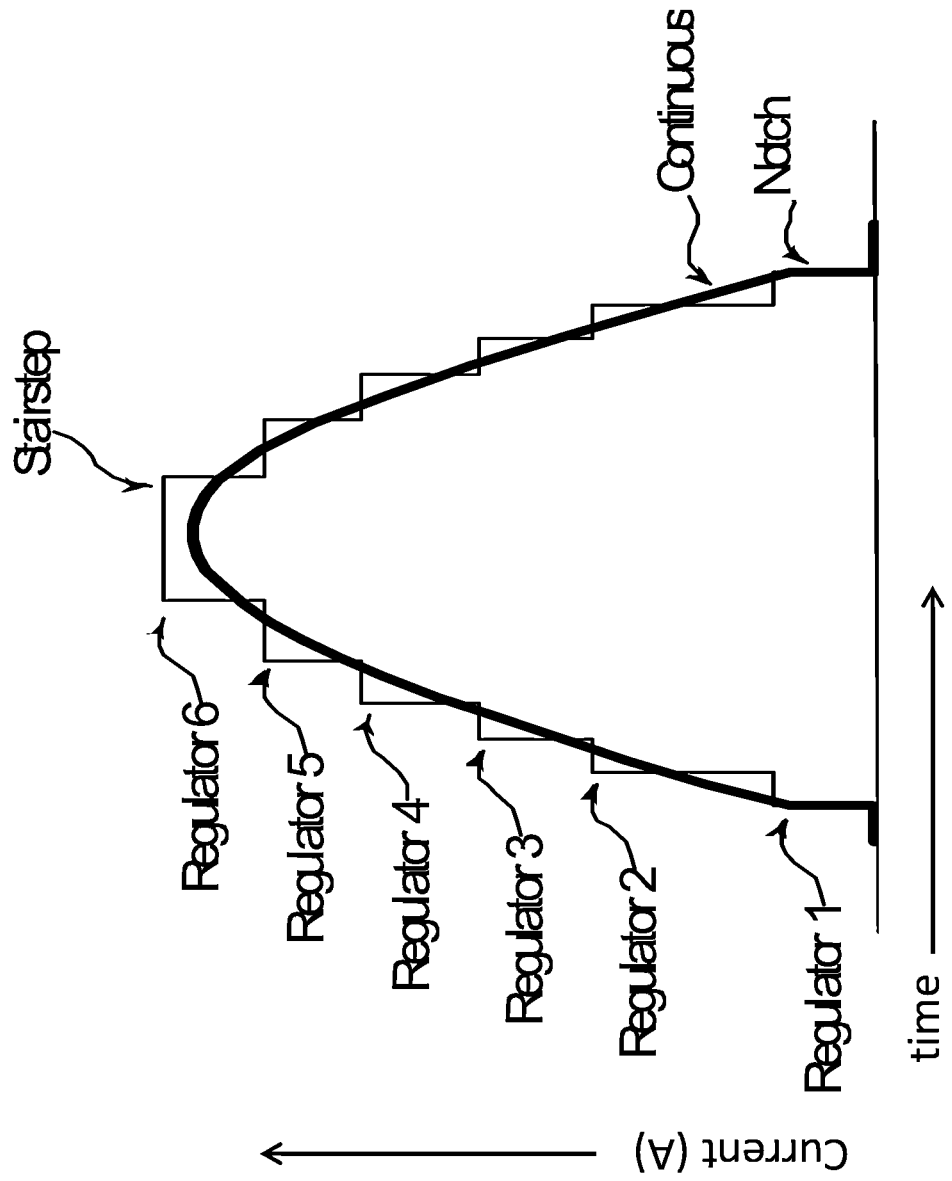
FIG. 2 depicts the input current over time for the system of FIG. 1.

Referring now to FIG. 2, both stairstep (corresponding to the circuit of FIG. 1) and continuous input current waveforms are shown. In most multi-stage, sequentially-operated linear LED drivers, each regulator regulates current at a fixed level, as indicated by the levels marked "Regulator 1", "Regulator 2", and so forth. As the driver transitions from one regulator to the next, it causes input current to jump from one level to the next, producing a stairstep waveshape. This waveshape causes distortion of the input current and can cause EMI. The small notch in the continuous waveshape is caused by the voltage of the first LED string segment. Below that first segment's forward voltage drop no input current flows.

Figure 3:
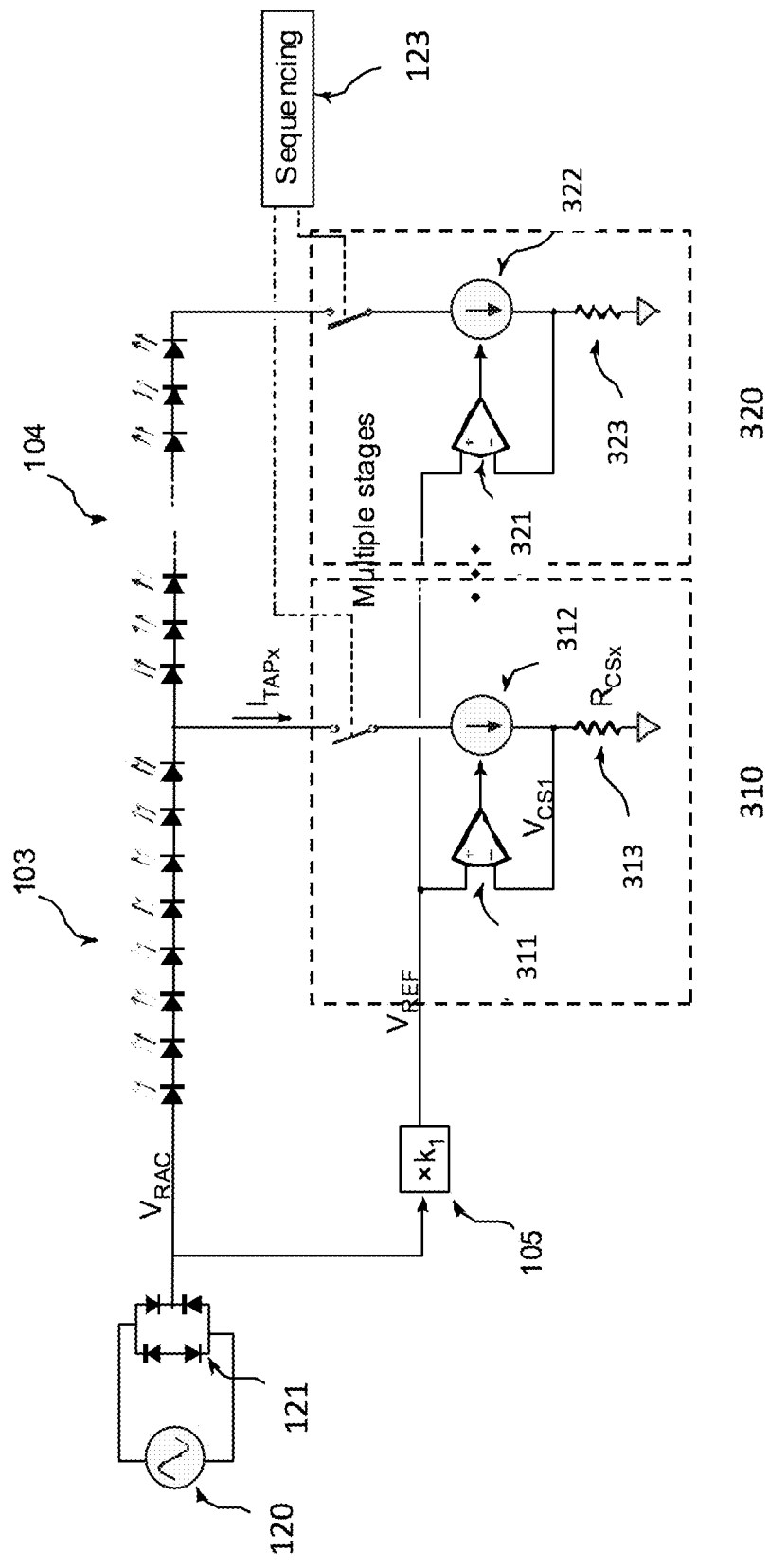
FIG. 3 depicts a prior art current regulation circuit used with strings of LEDs.

Referring to FIG. 3, a prior art LED system 300 comprising a continuous input current LED driver is shown. For ease of explanation, only 2 stages are shown. In actual practice, more stages could be used, or only one stage could be used.

As in FIG. 1, the input supply is a regulated-voltage AC sine wave source 120 connected to a full-wave bridge rectifier 121. The rectified AC voltage ($V_{RAC}$) is connected to LED segment 103 and LED segment 104 and is attenuated by attenuation element 105. The attenuation factor is represented by $k_1$. This reduces $V_{RAC}$ to a level, $V_{REF}$, that can be used by the low voltage control circuitry. $V_{REF}$ is used as a reference for the linear current regulators, and the input current waveform will be the same waveshape as the input voltage.

LED system 300 comprises current regulation circuit 310 and current regulation circuit 320. The current through current regulation circuit 310 is measured by current sense resistor 313, and the current through current regulation circuit 320 is measured by current sense resistor 323. Other current sensing methods could be used instead. With respect to current regulation circuit 310, a local feedback loop on error amplifier 311 compares the sense voltage with $V_{REF}$ and adjusts the current of current sink 312. Similarly, with respect to current regulation circuit 320, a local feedback loop on error amplifier 321 compares the sense voltage with $V_{REF}$ and adjusts the current of current sink 322. As downstream string segments become forward biased, the sequencing logic 123 shuts off the upstream regulators. For example, when LED segment 104 becomes forward biased, sequencing logic 123 shuts off current regulation circuit 310.

One drawback of this simplified prior art approach is that as the supply voltage increases in amplitude (peak-to-peak), the current also increases. Since input power is the product of voltage and current (P=I×V), the result is higher input power as both input voltage and current increases. This translates to higher output power and lamp brightness, resulting in poor line regulation. One solution is to monitor the average input voltage and use it to adjust the peak-to-peak amplitude of the current. The relationship between current and voltage is inverse I=P/V, therefore the current must be related to the inverse of the supply voltage. This requires a division operation. Implementation of a division circuit can be complex. Instead of implementing a division circuit, a simple linear function combined with a multiplier can be employed to approximate the inversion. Doing so would provide valuable additional benefits not provided by a conventional line regulation circuit, all without requiring additional circuitry.

Figure 4:
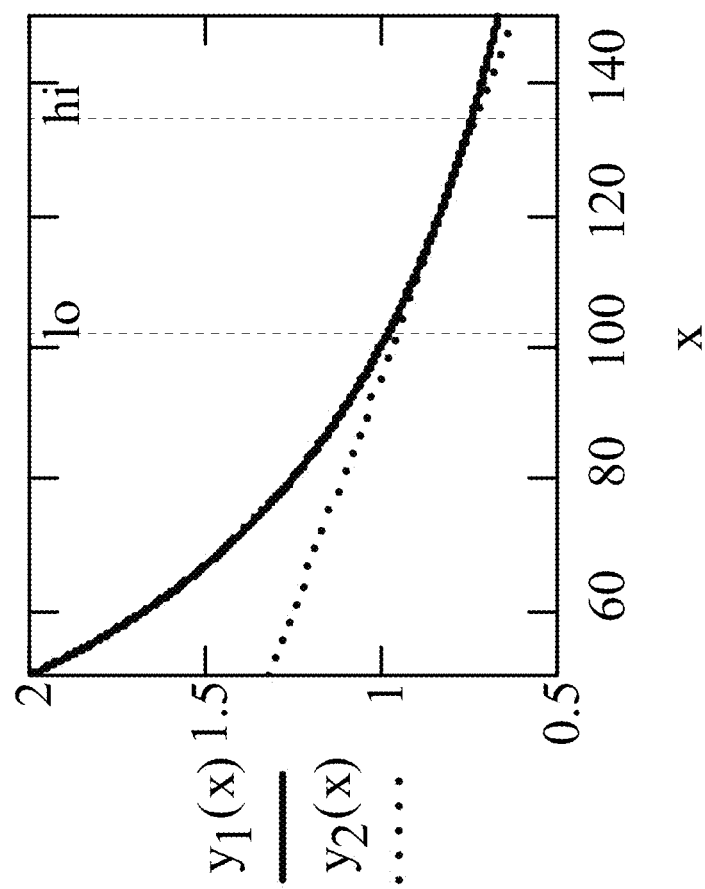
FIG. 4 depicts a linear approximation for the inverse of a supply voltage.

FIG. 4 shows how a linear approximation of an inversion can be accomplished. The solid line shows an inverse $i_1(v)=1/v$ function, while the dashed line shows a linear $i_2(v)=a-b \times v$ function. Note both the $i_1$ and $i_2$ functions have a negative slope for positive inputs, providing the inverse relationship required for reducing input current as input voltage increases. Over a given range of i values, denoted by the vertical 'lo' and 'hi' dashed lines, the ideal $i_1(v)$ function can be approximated by the linear $i_2(v)$ function.

Figure 5:
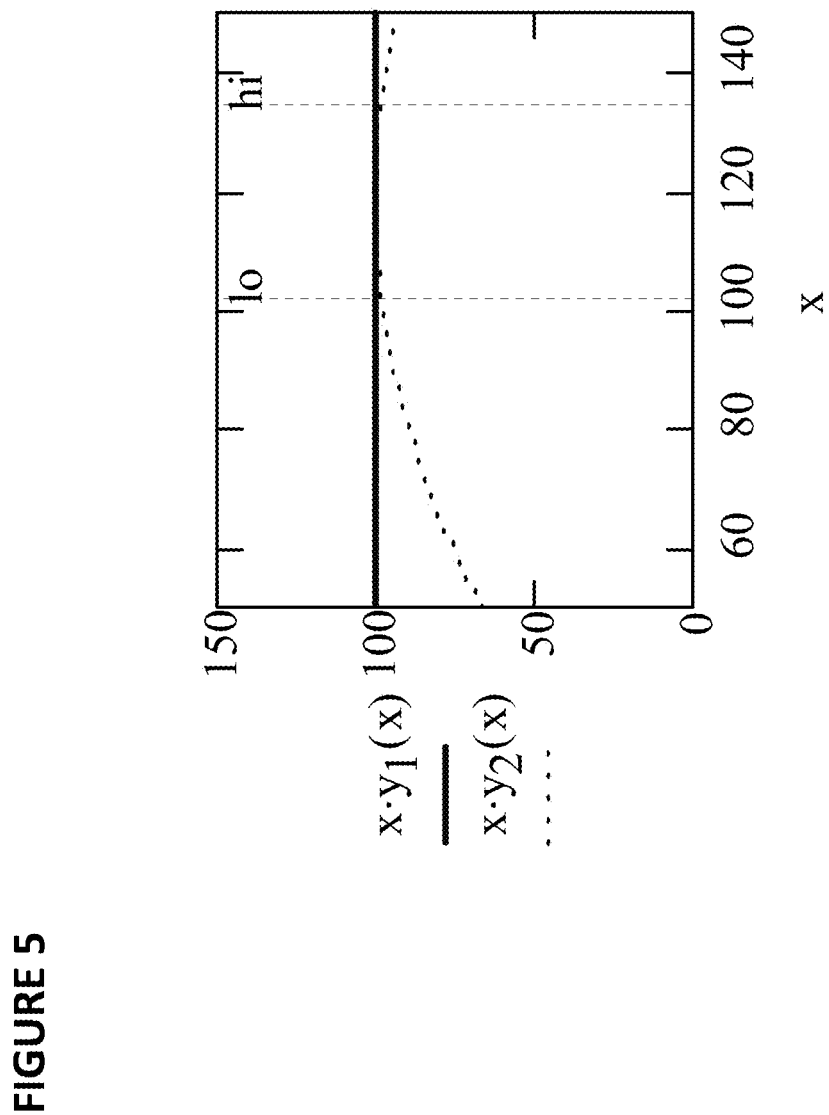
FIG. 5 depicts power associated with the inverse of a supply voltage and a linear approximation of the same.

Power is voltage times current (P=V×I). FIG. 5 shows the general functions for both the conventional and linear approximation to obtain power: $p_1(v)=v \times i_1(v)$ and $p_2(v)=v \times i_2(v)$. $p_1$ is for ideal line regulation while $p_2$ is for the linear approximation. These two functions describe power (p) as voltage (v) times current (i). As depicted in FIG. 4, the $p_1$ function maintains a constant power over the entire range of v values, while the $p_2$ function falls off above and below the range of interest. This is not a shortcoming of the linear approximation, rather it actually provides some useful benefits that a conventional line regulation circuit lacks. Within the normal operating range for input voltage, power is maintained fairly constant, but as input voltage decreases below the normal range or increases above it, input current and power decreases, providing safe operating characteristics. Here, the normal operating range for input voltage is a peak value of 120V+/−15% (or 102V-138V) in the United States. The normal operating range for input voltage outside of the United States might have a different peak value, but the tolerance of +/−15% based on the standard peak value of a particular country is generally considered to be the normal operating range. In contrast to the prior art, the present invention does not counteract a dimmer (if present), but instead allows the dimmer to dim the lamp. And at low dimming settings, input current falls off rather than increasing to destructive levels.

Figure 6:
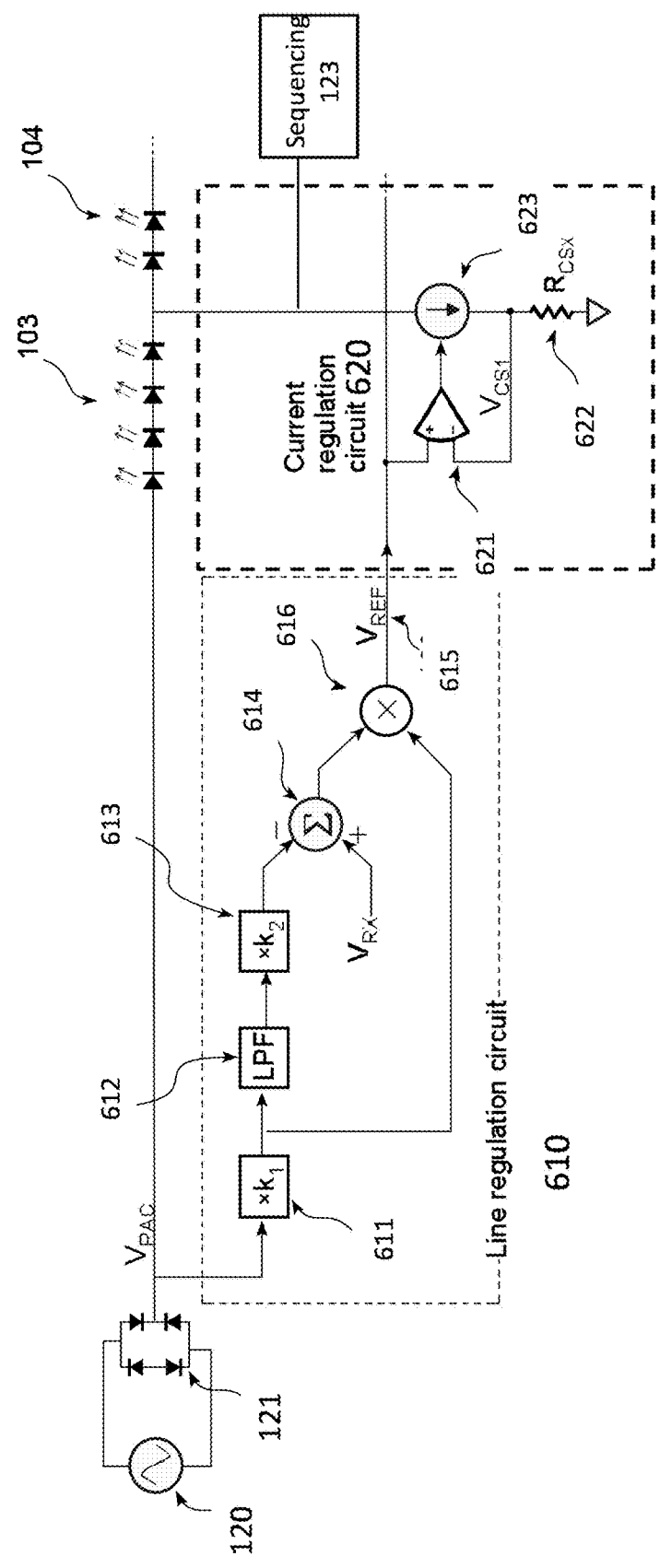
FIG. 6 depicts an embodiment of an input current LED driver that utilizes a linear approximation of the inverse of a supply voltage.

Referring to FIG. 6, an LED system 600 for implementing the aforementioned linear approximation is presented. LED system 600 comprises a regulated-voltage AC sine wave source 120 connected to a full-wave bridge rectifier 121 as in FIGS. 1 and 3. The embodiment further comprises line regulation circuit 610 and current regulation circuit 620.

Line regulation circuit 610 comprises attenuation element 611, low pass filter 612, attenuation element 613, subtractor 614 that receives a reference voltage $V_{RX}$, multiplier 616, and reference voltage 615 ($V_{REF}$). Current regulation circuit 620 is the same as the current regulation circuits 310 and 320 described previously for FIG. 3. In current regulation circuit 620, a local feedback loop on error amplifier 621 compares the sense voltage with $V_{REF}$ 615 and adjusts the current of the current sink 623.

Attenuation element 611 attenuates the rectified voltage $V_{RAC}$ by a factor of k1. This reduces $V_{RAC}$ to a level, that can be used by the low voltage control circuitry. Low pass filter 612 has a cutoff frequency well below the line frequency, essentially providing the average of $V_{RAC}$. This signal representing the average voltage of $V_{RAC}$ (scaled by k1) optionally may then be scaled by attenuation element 613, whose value is represented by $k_2$. The value of $k_2$ may be less than 1, equal to 1, or greater than 1. The scaled signal is then provided to the negative input of the subtractor 614. The reference voltage $V_{RX}$ is applied to the positive input of the subtractor 614. That the average $V_{RAC}$ is subtracted is critical, as it provides the negative slope with respect to input voltage amplitude that approximates the inversion required to reduce input current as input voltage increases. The values of $k_1$, $k_2$, and $V_{RX}$ must be carefully selected to properly configure the circuit for the best possible line regulation.

The output of the linear approximation circuit then multiplies the $V_{RAC}$ signal that represents the rectified AC input voltage to provide the reference for establishing the current in the linear current regulators. With this line regulation circuit, the input current appears purely resistive, precisely tracking the input voltage waveshape. At the same time it provides reasonable line regulation and dimmer compatibility.

The order and arrangement of these elements may vary without compromising the basic premise of the invention.

The reference voltage 615, $V_{REF}$, provided to the current regulators is described by the following equation.

$$V_{REF} = k_1 \times [V_{RX} - (k_1 \times k_2 \times \overline{v_{RAC}})] \times V_{RAC}$$

When used to establish current in a typical current regulation circuit comprising of a current sense resistor, an error amplifier, and an output transistor, the following equation may be applied.

$$I_{REG} = \frac{V_{REF}}{R_{SNS}}$$

In the example of FIG. 6, $I_{REG}$ is the current through current sink 623 and $R_{SNS}$ is RCSX, the resistance of sense resistor 622.

Figure 7:
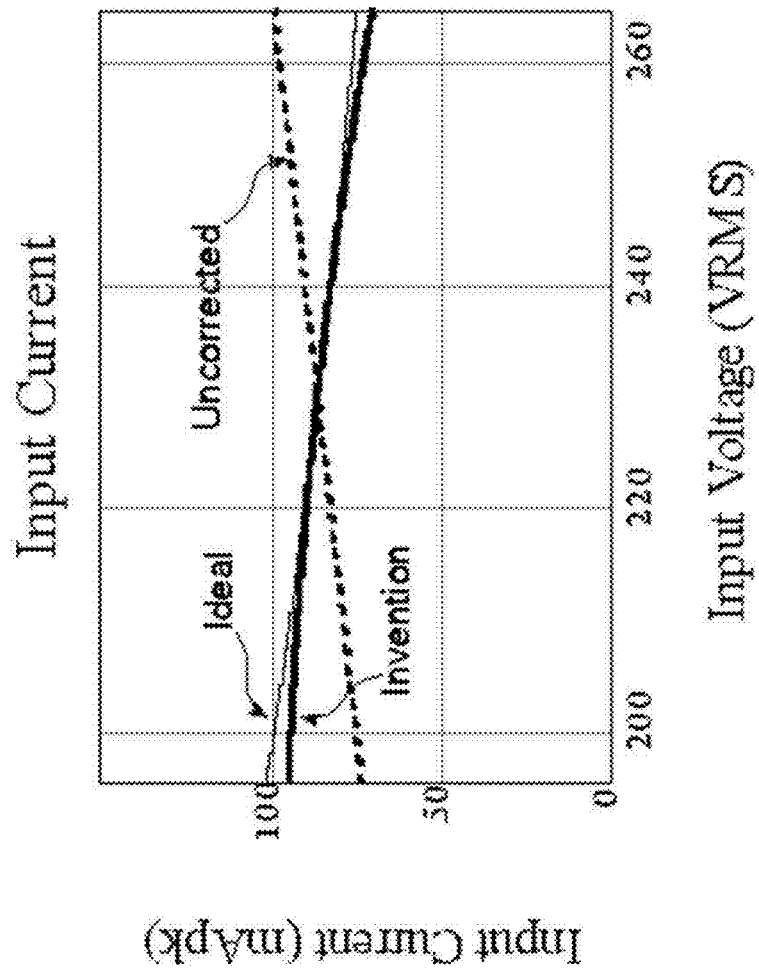
FIG. 7 depicts the peak input current for various line regulation circuits.

FIG. 7 shows the peak input current for various line regulation circuits. The curve marked "uncorrected" shows what the peak input current would be if there were no line regulation. The curve marked "ideal" shows the peak input current if perfect line regulation were implemented. The curve marked "invention" shows the peak input current when the line regulation circuit of FIG. 6 is implemented, using optimized values for $k_1$, $k_2$, and $V_{RX}$.

Figure 8:
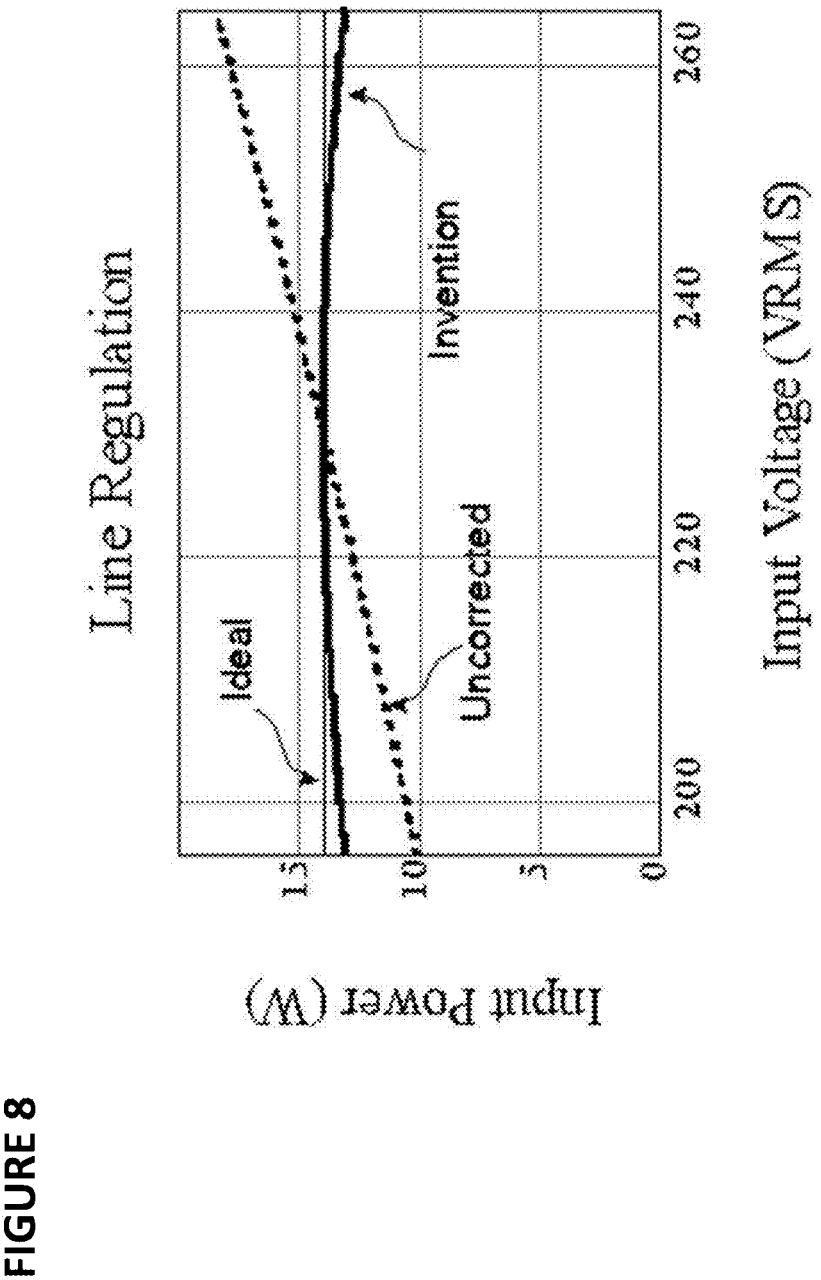
FIG. 8 depicts input power for various line regulation circuits.

FIG. 8 shows line regulation in terms of input power for the same three configurations shown in FIG. 7. The input voltage range is 230 VAC+/−15%. The output power is nominally 14 W and varies about 0.4 W over the input voltage range. This is +/−3% line regulation.

Figure 9:
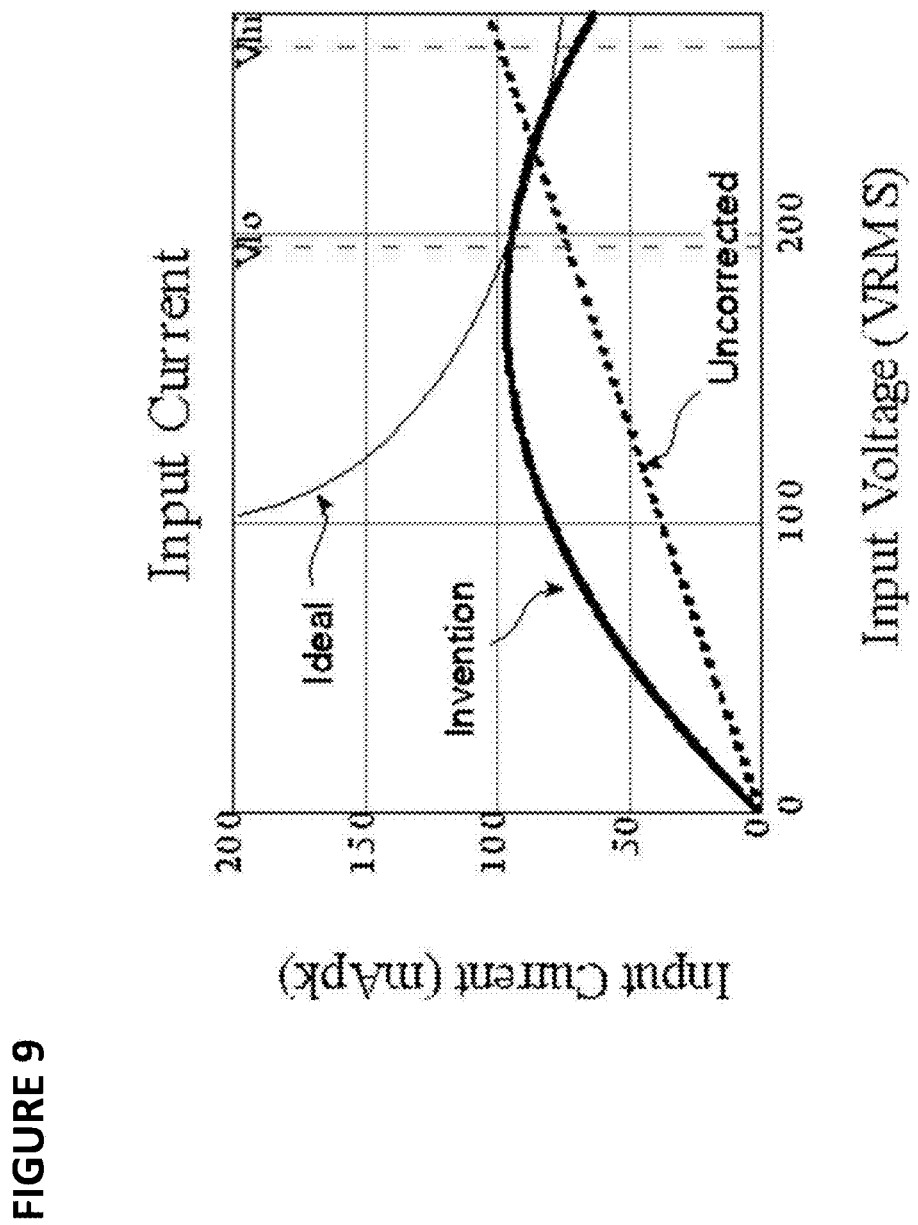
FIG. 9 depicts input current for various line regulation circuits.

FIG. 9 shows the input current over a wider range of supply voltages for the three configurations of FIG. 7. The normal range of line voltages is delineated by the 'Vlo' and 'Vhi' vertical lines. It is important to note that as supply voltage decreases, the input current using the line regulation circuitry (labeled 'invention') peaks not much higher than at the normal low line voltage, then reverses direction and decreases. This is an important safety feature that reduces input power above and below the normal supply voltage range. Contrast this with ideal line regulation, show by the curve labeled 'Ideal'. For ideal line regulation, the input current continues to climb as input voltage decreases, eventually reaching destructive levels.

Figure 10:
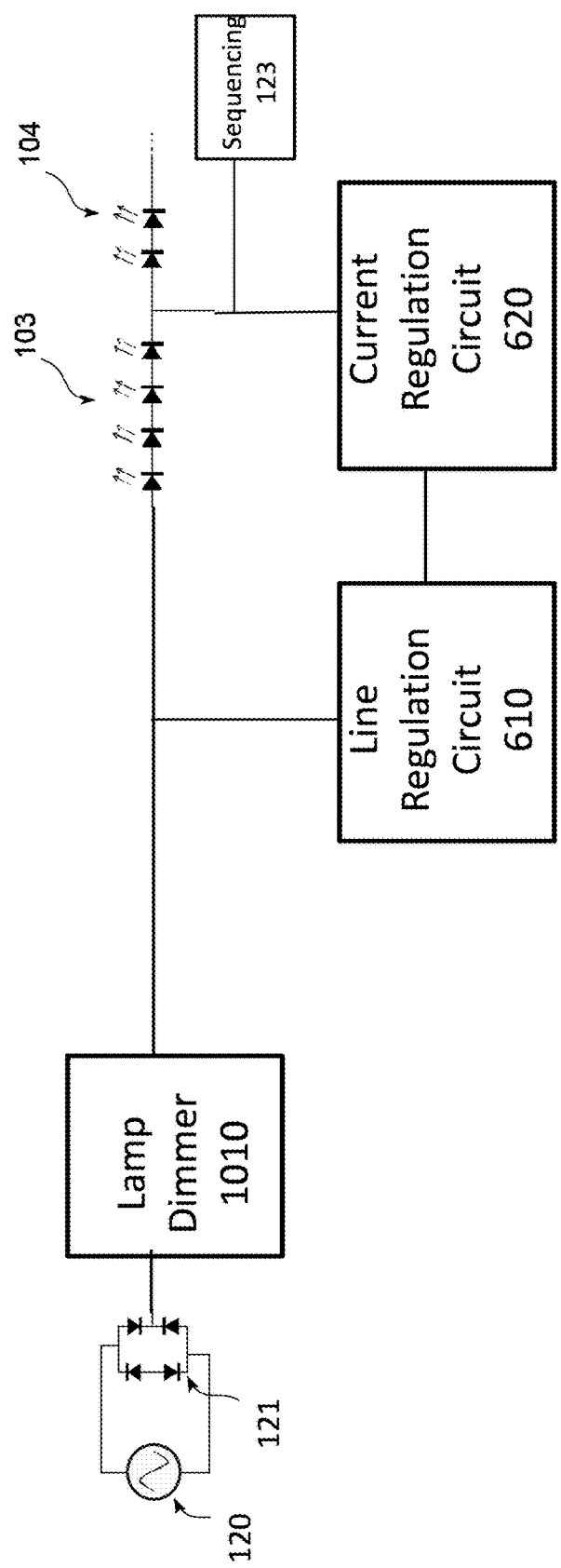
FIG. 10 depicts the embodiment of FIG. 6 used with a lamp dimmer.

FIG. 10 depicts the use of the embodiment of FIG. 6 in a LED system 1000 comprising lamp dimmer 1010.

Figure 11:
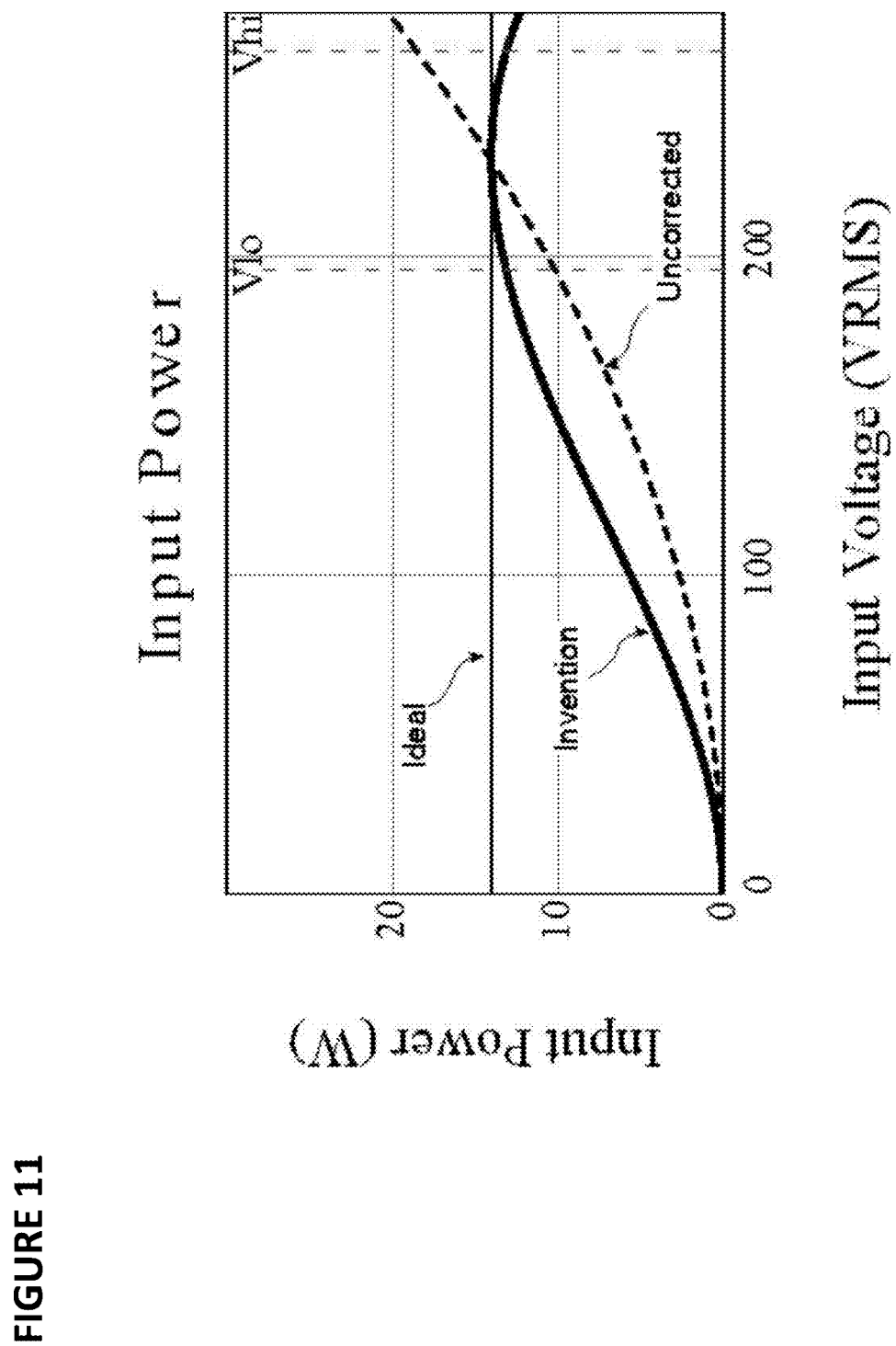
FIG. 11 depicts input power for the system of FIG. 10.

FIG. 11 shows the behavior of the circuit of FIG. 10 when used with lamp dimmer 1010. As the lamp dimmer 1010 reduces the conduction angle, the average rectified AC voltage provided to the driver drops. If an ideal line regulation circuit were employed, the dimmer 1010 would not have any effect on lamp brightness as the regulation circuit maintains constant power as input voltage decreases. Contrast this with the present invention which is shown on FIG. 8 as the curve labeled 'Invention'. As input voltage decreases below the normal range of supply voltages, input power decreases as well, and thus brightness decreases as the dimmer is turned down. Dimmer 1010 compatibility is an inherent part of the line regulation circuit. No special circuitry is required for dimmer compatibility.

Figure 12:
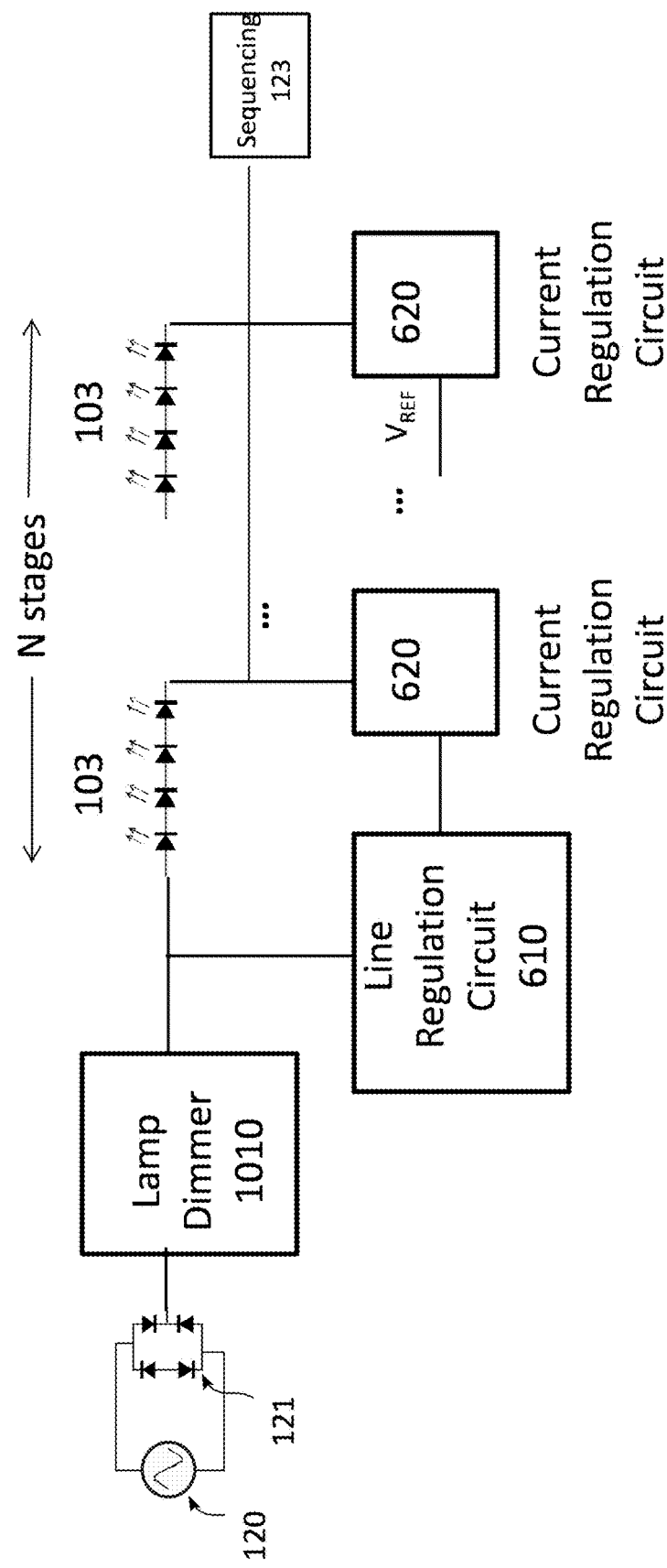
FIG. 12 depicts an embodiment of an LED system
Figure 13E:
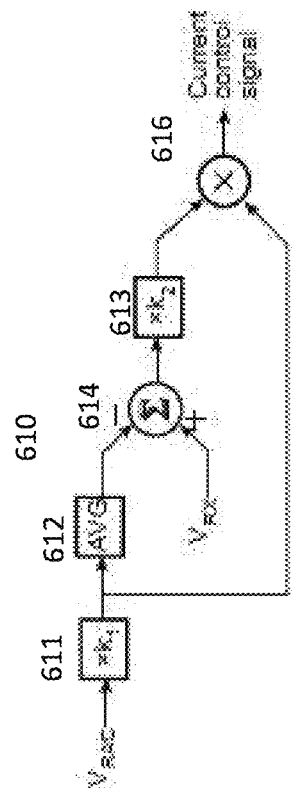
Figure 13F:
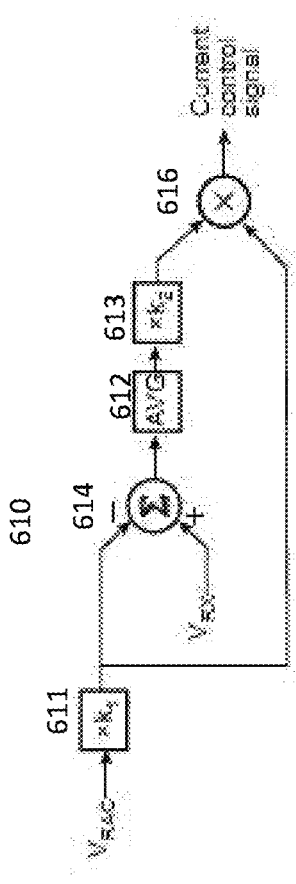
Figure 13G:
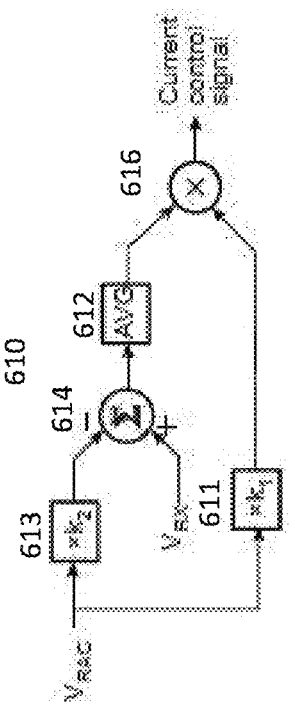
Figure 13H:
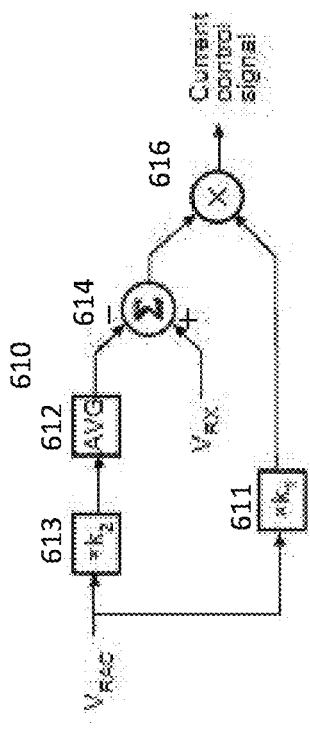
Figure 13I:
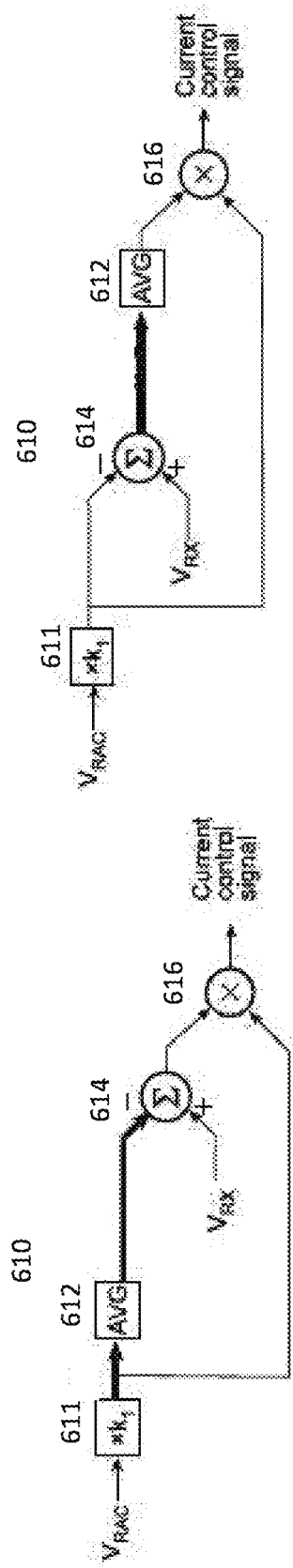
Figure 13J:
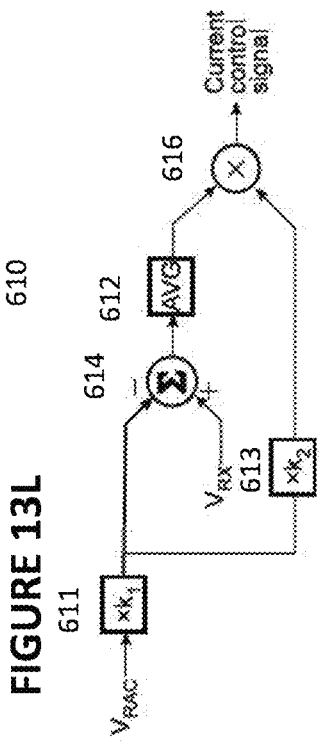
Figure 13K:
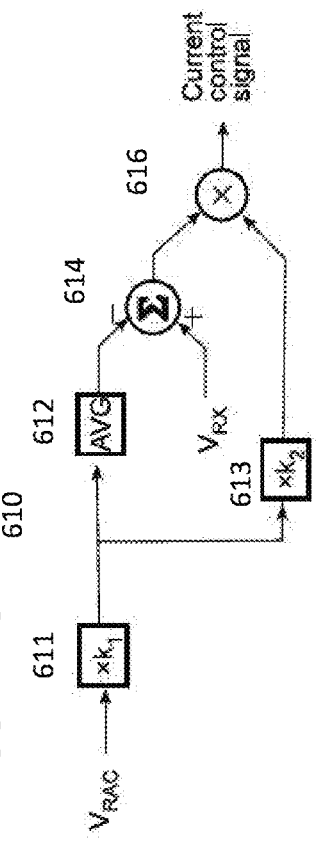
Figure 13L:
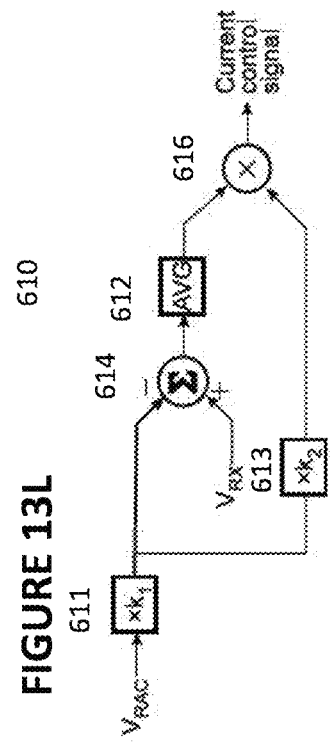

With reference to FIG. 12, the applicability of the embodiments described above are shown in LED system 1200 comprising N stages, with N being an integer of 1 or greater, where each of the N stages comprises LED segment 103 and current regulation circuit 620.

With reference to FIGS. 13A-13L, different embodiments of line regulation circuit 610 are shown. Line regulation circuit 610 can comprise different configurations of attenuation element 611, low pass filter 612 (which performs an averaging function), attenuation element 613, subtractor 614, and multiplier 616, as shown in the various figures. Although the configuration of the various components will vary among FIGS. 13A-13L, the operation of each component will be the same as described previously.

References to the present invention herein are not intended to limit the scope of any claim or claim term, but instead merely make reference to one or more features that may be covered by one or more of the claims. Structures, processes and numerical examples described above are exemplary only, and should not be deemed to limit the claims. It should be noted that, as used herein, the terms "over" and "on" both inclusively include "directly on" (no intermediate materials, elements or space disposed there between) and "indirectly on" (intermediate materials, elements or space disposed there between).

What is claimed is:

1. A circuit for controlling current in one or more current regulators comprising:
   a first circuit for accepting and scaling a time-varying signal;
   a circuit for generating a time-average of the first scaled signal;
   a second circuit for scaling the time-averaged signal;
   a circuit for subtracting the second scaled signal from a fixed reference signal;
   a circuit for multiplying the first scaled signal by the subtracted signal;
   one or more current regulators for receiving the multiplied signal.

2. A circuit for controlling current in one or more current regulators comprising:
   a first circuit for accepting and scaling a time-varying signal;
   a circuit for generating a time-average of the first scaled signal;
   a circuit for subtracting the time-averaged signal from a fixed reference signal;
   a second circuit for scaling the subtracted signal;
   a circuit for multiplying the first scaled signal by the second scaled signal;
   one or more current regulators for receiving the multiplied signal.

3. A circuit for controlling current in one or more current regulators comprising:
   a first circuit for accepting and scaling a time-varying signal;

a second circuit scaling the first scaled signal;
a circuit for generating a time-average of the first scaled signal;
a circuit for subtracting the time-averaged signal from a fixed reference signal;
a circuit for multiplying the second scaled signal by the subtracted signal;
one or more current regulators for receiving the multiplied signal.

* * * * *